US008991892B2

(12) United States Patent
Meszaros et al.

(10) Patent No.: US 8,991,892 B2
(45) Date of Patent: Mar. 31, 2015

(54) COWL TRIM ASSEMBLY WITH ADJUSTABLE FOOTREST

(71) Applicant: Ford Global Technologies, LLC, Dearborn, MI (US)

(72) Inventors: Edward Joseph Leonard Meszaros, Amhesrtburg (CA); David Thomas Patrick, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 79 days.

(21) Appl. No.: 13/755,223

(22) Filed: Jan. 31, 2013

(65) Prior Publication Data

US 2014/0210227 A1 Jul. 31, 2014

(51) Int. Cl.
*B60N 3/06* (2006.01)

(52) U.S. Cl.
CPC ........................................ *B60N 3/06* (2013.01)
USPC ............................................ 296/75; 296/1.07

(58) Field of Classification Search
CPC ....................................................... B60N 3/06
USPC ........... 296/75, 72, 192, 193.01, 193.03, 1.07
See application file for complete search history.

(56) References Cited

U.S. PATENT DOCUMENTS

| 895,632 | A | * | 8/1908 | Harris | ............................. 296/75 |
| 1,389,209 | A | * | 8/1921 | Myatt | ............................. 296/75 |
| 4,310,193 | A | * | 1/1982 | Kolleas | ........................... 296/75 |
| 6,318,785 | B1 | | 11/2001 | Tousignant | |
| 6,318,786 | B1 | * | 11/2001 | Sauve et al. | ...................... 296/75 |
| 6,834,904 | B2 | * | 12/2004 | Sauvonnet et al. | ............. 296/75 |
| 7,841,640 | B2 | | 11/2010 | Bowen | |
| 7,967,358 | B2 | * | 6/2011 | Shukuri et al. | .................. 296/75 |
| 2003/0084744 | A1 | * | 5/2003 | Parenteau et al. | ............... 74/512 |

* cited by examiner

*Primary Examiner* — Jason S Morrow
*Assistant Examiner* — E Turner Hicks
(74) *Attorney, Agent, or Firm* — Vichit Chea; Price Heneveld LLP

(57) ABSTRACT

A cowl trim assembly includes a panel body having an outwardly extending support base. An adjustable footrest assembly is supported on the support base between fore and aft positions. The footrest assembly includes connecting members adapted to couple the adjustable footrest assembly to the panel body at laterally extending slots disposed on the panel body. The laterally extending slots include receiving grooves incrementally spaced along the slots which are adapted to receive the connecting members of the footrest assembly in assembly. Thus, the footrest assembly is laterally adjustable relative to the panel body along the length of the slots.

19 Claims, 8 Drawing Sheets

US 8,991,892 B2

COWL TRIM ASSEMBLY WITH ADJUSTABLE FOOTREST

FIELD OF THE INVENTION

The present invention generally relates to a cowl trim piece for use in a vehicle interior, and more specifically, to a cowl trim piece having an adjustable footrest assembly which is adapted to provide customized footrest support to a vehicle occupant.

BACKGROUND OF THE INVENTION

Footrest assemblies are generally installed on a vehicle floorboard in a vehicle interior on the driver's side of the vehicle interior. These footrests are generally supported with welded studs, hat-shaped support brackets, foam blocks or other like support mechanisms which are stationary supports which are rigidly secured to a vehicle floorboard and then covered with carpet to conceal the support system of the footrest. Often times, these footrest assemblies are standalone assemblies, much like a dead pedal design, which are used for increased rigidity in the footrest structure and at the same time generally increase the costs of the overall footrest assembly installation. When incorporating a footrest assembly into a vehicle design, changing the vehicle floor geometry to support a standalone footrest can be very difficult and costly on the manufacturing side. Thus, a need exists for a footrest assembly that can be added to a carryover vehicle without requiring expensive tooling and other cost implications tied to floorboard configurations and standard vehicle carpets. Further, a need exists for a footrest assembly that can be adjusted to suit the needs of the vehicle occupant. Generally, footrest assemblies have a static or fixed position with a "one size fits all" result. Further, adjustable footrest assemblies currently known generally require moving parts and motors to electronically adjust the footrest position. These assemblies are often expensive and complicated and generally require the floorboard support systems noted above to support the footrest assembly.

The present invention provides a footrest assembly which can be easily installed on a carryover vehicle, wherein the footrest assembly is adjustably supported by a cowl trim assembly as coupled to a vehicle frame.

SUMMARY OF THE INVENTION

One aspect of the present invention includes a cowl trim assembly having a panel body with one or more lateral slots disposed thereon. The lateral slots each include receiving grooves spaced along the length of the lateral slots. A support base extends outwardly from the panel body and is adapted to support an adjustable footrest assembly. The adjustable footrest assembly is adjustable between fore and aft positions relative to the panel body. The footrest assembly includes one or more connecting members which are adapted to be received in the receiving grooves of the lateral slots to couple the footrest assembly to the panel body.

Another aspect of the present invention includes a cowl trim assembly having a panel body with an outwardly extending support base. A modular footrest assembly is supported on the support base and includes one or more connecting members. Slots are disposed on the panel body having a plurality of receiving grooves adapted to receive the connecting members of the footrest assembly. The receiving grooves are spaced along a length of the slots of the panel body. The footrest assembly is laterally adjustable relative to the panel body along a length of the slots.

Yet another aspect of the present invention includes a cowl trim assembly having a panel body including a support base. The panel body further includes first and second laterally extending slots disposed thereon. An adjustable footrest assembly is slidably supported on the support base and includes connecting members adapted to couple with the first and second laterally extending slots of the panel body. The adjustable footrest is laterally adjustable relative to the panel body in assembly.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
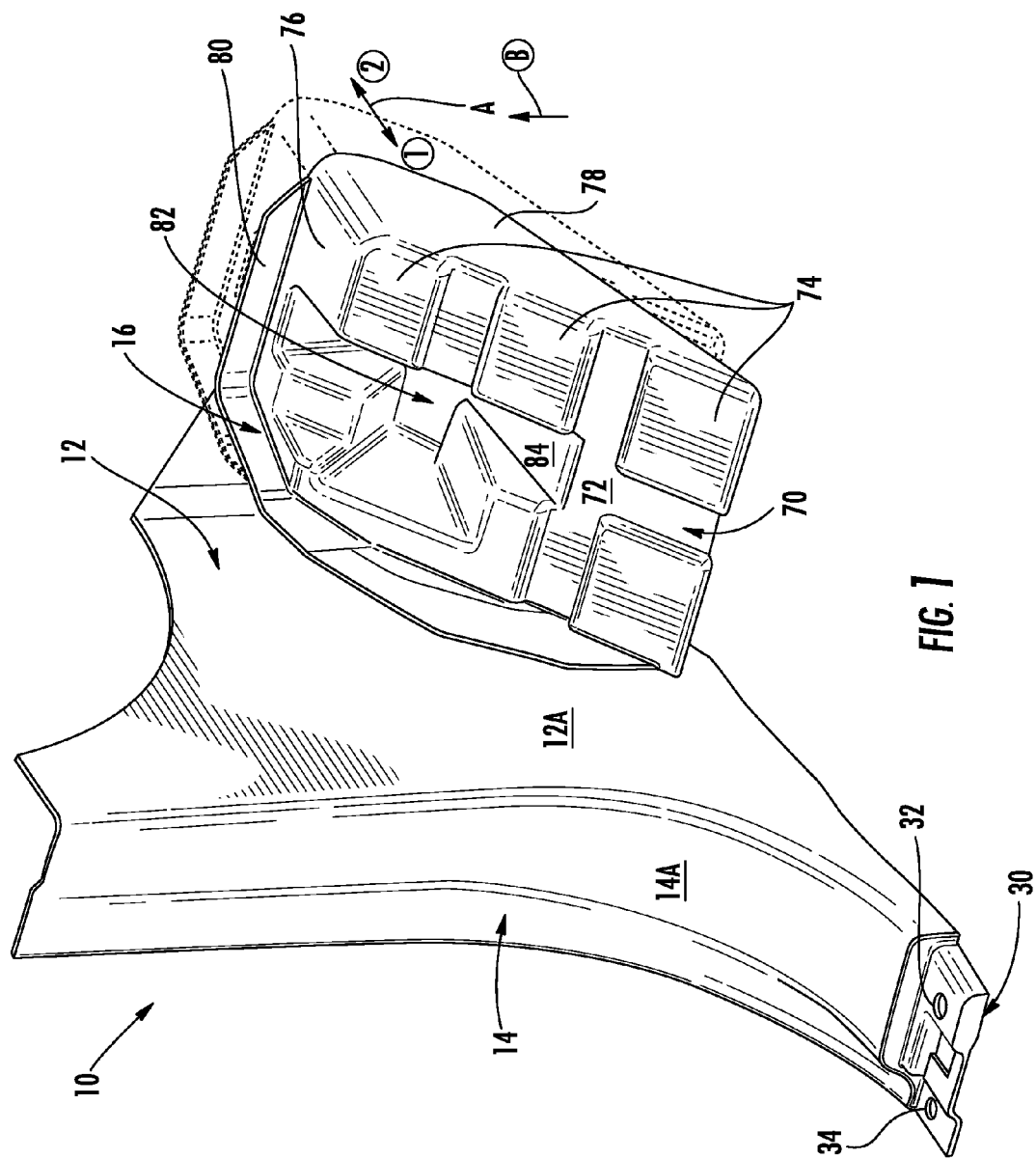
FIG. 1 is a front perspective view of a cowl trim assembly according to one embodiment of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, the reference numeral 10 generally designates a cowl trim assembly for use in a vehicle interior. Specifically, the cowl trim assembly 10 is generally considered a left-hand trim piece adapted to be disposed in a lower portion of a vehicle interior as best shown in the environmental view of FIG. 8. The cowl trim assembly 10 includes a panel body having a side panel 12 with an exterior facing side 12A and a front panel 14 with an exterior facing side 14A. The side panel 12 and the front panel 14 are generally orthogonal or perpendicular to one another such that the exterior side 14A of the front panel 14 will generally face a vehicle occupant, or driver, when a vehicle door is in an open position, and will generally be concealed when the vehicle door is closed. As such, the front panel 14 is generally disposed and operably connected to sheet metal parts of a vehicle frame as disposed about a door sill of the vehicle. The exterior side 12A of side panel 12 generally faces inwardly into the vehicle interior near the driver's side floorboard.

As further shown in FIG. 1, a footrest assembly 16 is disposed on a lower portion of the side panel 12 thereby defining a footrest assembly for use by the vehicle occupant. As shown in FIG. 1, the footrest assembly 16 is an adjustable modular footrest assembly, such that the footrest assembly 16 is moveable between fore and aft positions along a path as indicated by arrow A relative to the side panel 12. In this way, the cowl trim assembly 10 of the present invention provides a footrest assembly 16 that can be adjusted to meet the varied anthropometrics of different vehicle occupants, thereby making the present invention customizable for individual comfort.

Figure 8:
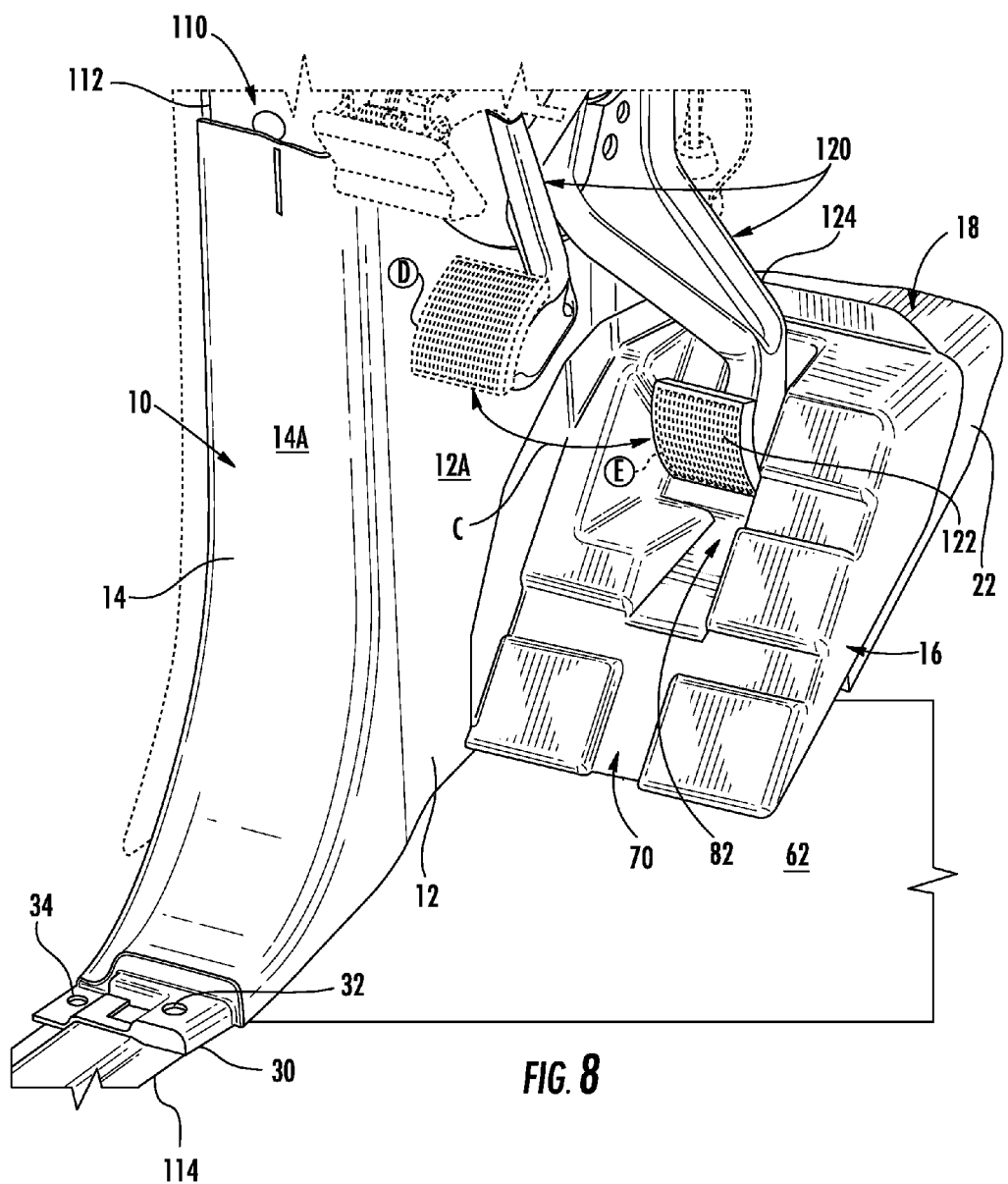
FIG. 8 is an environmental view of the cowl trim assembly of FIG. 1 as installed in a vehicle interior.

As shown in FIG. 1, the front panel 14 is a sloped panel which is adapted to cover the intersection of an upright portion of a door sill and the floor or rocker panel of the door sill as best shown in FIG. 8. At a lowermost and front most portion of the front panel 14, a tab 30 is disposed having one or more connecting apertures 32, 34 which are adapted to couple the cowl trim assembly 10 to a rocker panel assembly using connecting features such as screws or clips. As shown in FIG. 1, the tab member 30 is generally an underlay-type tab member which would generally be covered by a scuff plate trim piece to conceal the connection of the cowl trim piece 10 to the rocker plate of the vehicle frame. The tab portion 30 of the cowl trim assembly 10 has a generally stepped configuration such that connecting aperture 34 is disposed on a lower level relative to connecting aperture 32. The stepped configuration of the tab portion 30 allows for the tab portion 30 to closely follow the contours of the rocker plate of the vehicle frame for securely coupling the cowl trim assembly 10 thereto.

Figure 2:
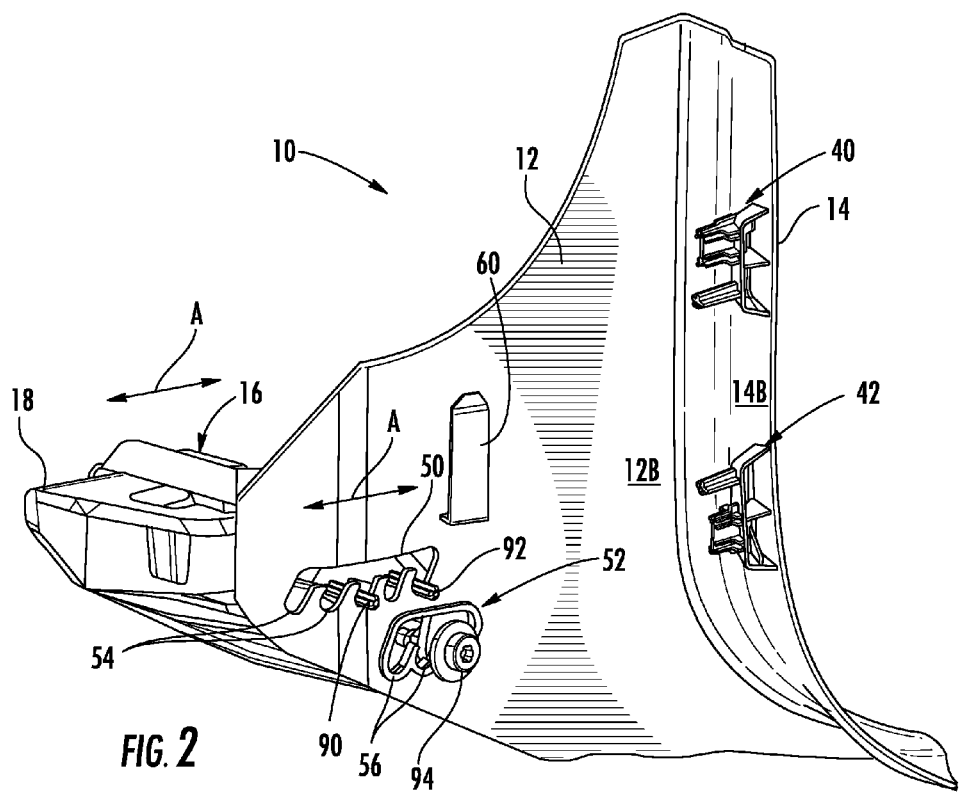
FIG. 2 is a rear perspective view of the cowl trim assembly of FIG. 1.

Referring now to FIG. 2, the cowl trim assembly 10 is shown from a generally interior side, such that interior portions 12B, 14B the side panel 12 and front panel 14 are visible. On the interior side 14B of front panel 14, anchor mechanism 40, 42 are disposed. As shown, anchor mechanism 40 is disposed generally above anchor mechanism 42 on the interior side 14B of front panel 14. Each anchor mechanism 40, 42 includes a base portion 44 having a clip portion 46 and a guide member 48 disposed thereon. In assembly, the clip portions 46 are adapted to clip the anchor mechanisms 40, 42 to a vehicle frame member while the guide members 48 are adapted to ensure that the anchor mechanisms 40, 42 are properly aligned with the vehicle frame such that the cowl trim assembly 10 can be easily and properly installed. As shown in FIG. 2, the clip mechanism 46 of anchor mechanism 40 is disposed above the guide member 48 in assembly. Conversely, the clip member 46 of anchor mechanism 42 is disposed below guide member 48 in assembly. The diversified configurations of the anchor mechanisms 40, 42 provide for a more rigid engagement of the cowl trim assembly 10 with the vehicle frame and thereby provide for better dispersion of forces realized on the cowl trim assembly 10 into the vehicle frame. As further shown in FIG. 2, an engagement feature 60 is disposed on the interior side 12B of the side panel 12 which is generally adapted to engage a member of the vehicle frame thereby ensuring that the side panel 12 of the cowl trim assembly 10 stays securely connected to the vehicle frame and does not separate and interfere with the pedal operation by the vehicle occupant.

Figure 3:
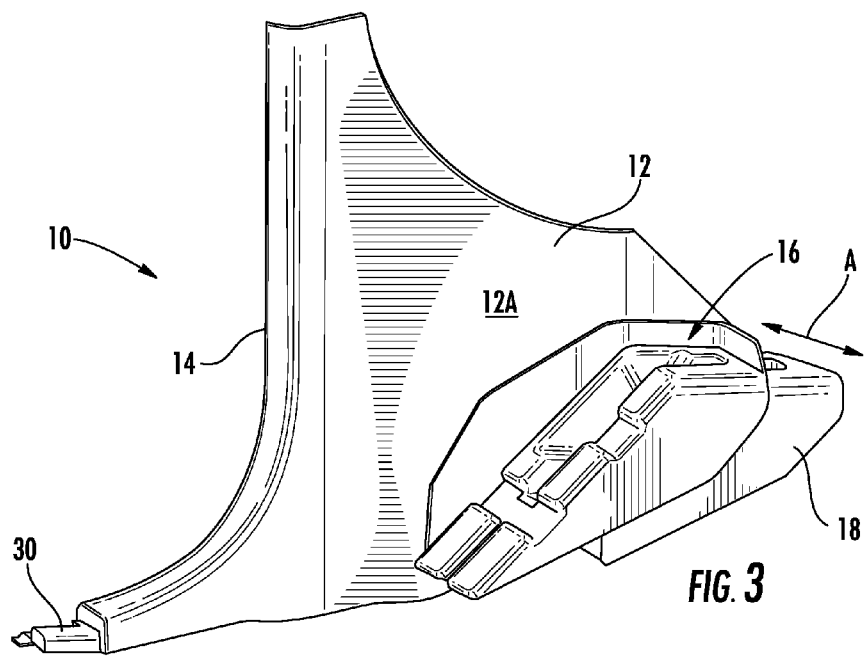
FIG. 3 is a side perspective view of the cowl trim assembly of FIG. 1.
Figure 4:
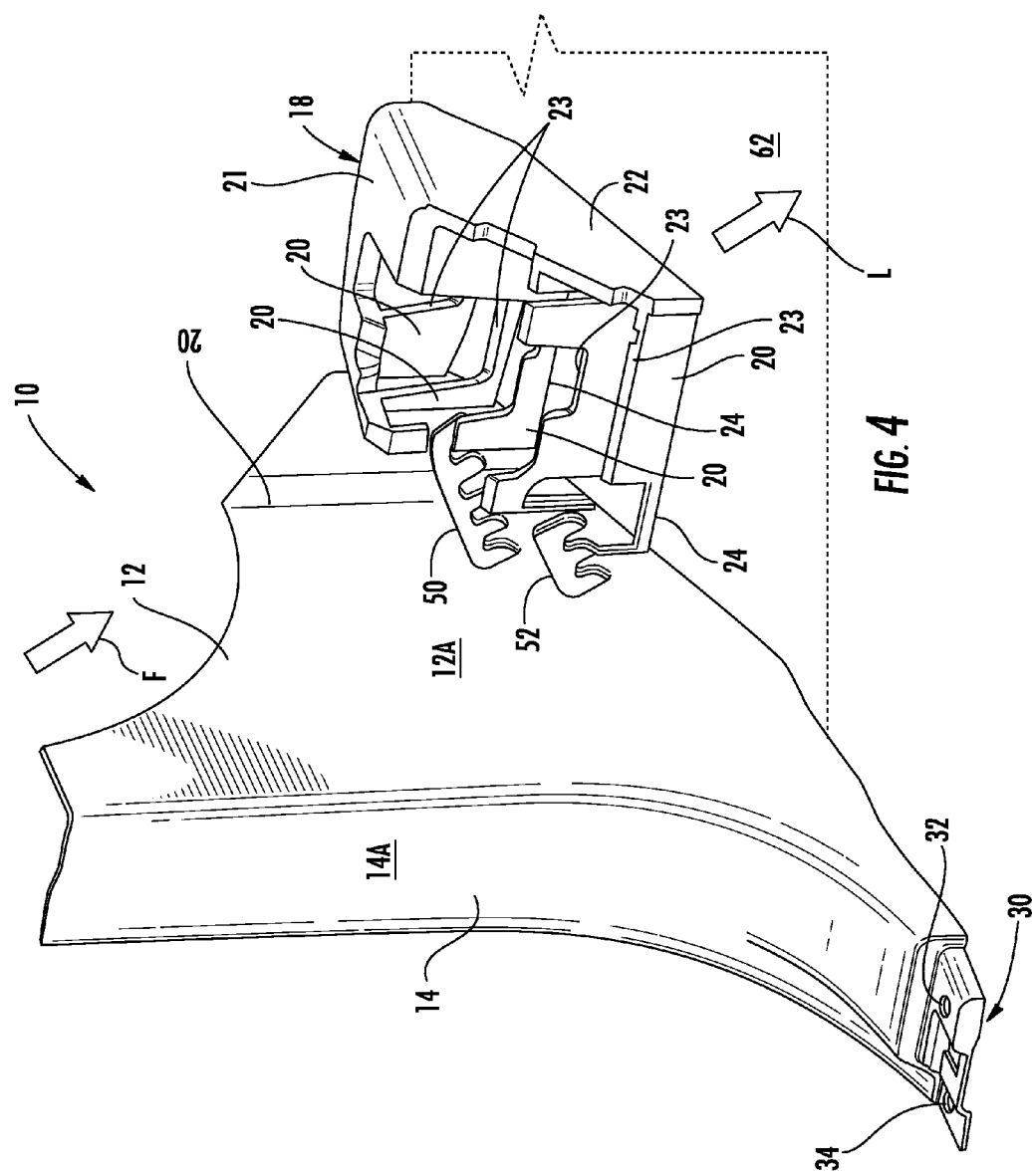
FIG. 4 is a front perspective view of the cowl trim assembly of FIG. 1 having the footrest assembly removed.
Figure 6:
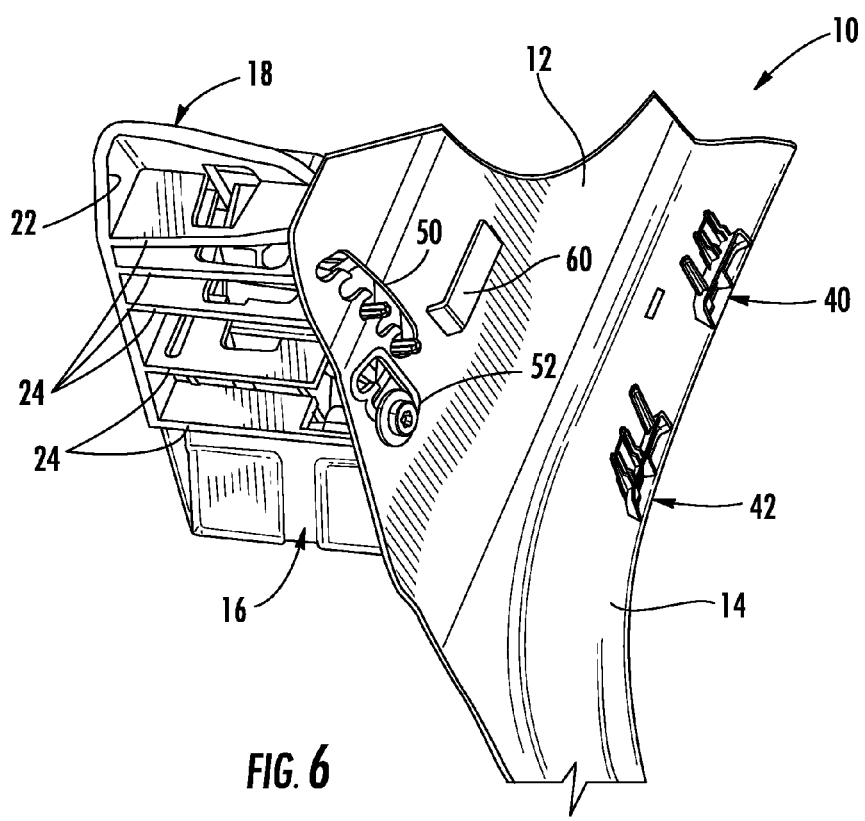
FIG. 6 is a bottom perspective view of the cowl trim assembly of FIG. 1.

As shown in FIGS. 3 and 4, the footrest assembly 16 is adapted to be adjustably supported on a support base 18. The support base is an integrated component part of the cowl trim assembly 10 and extends outwardly towards the vehicle interior where the support base 18 is supported in an upright manner on a vehicle floorboard 62. The support base 18 includes a plurality of reinforcement members 20 which, along with a top wall 21 and a side wall 22, generally define the overall structure of the support base 18. As shown in the embodiment of FIGS. 3 and 4, the reinforcement members 20 generally extend from the side panel 12 to the sidewall 22 and include contoured upper landing portions 23 which are adapted to abut and support the modular footrest assembly 16 as further described below. The reinforcement members 20 further comprise generally planar lower portions 24, best shown in FIG. 6, which are adapted to abut the vehicle floorboard 62 in assembly. In this way, the planar lower portions 24 of the reinforcement members 20 are adapted to support the footrest assembly 16 on a vehicle floor 62 and carry loads or forces realized on the footrest assembly 16 from a vehicle occupant to the vehicle floorboard 62. As shown in FIGS. 3-4 and 6, the reinforcement members 20 are disposed in a generally parallel spaced apart relationship. The cowl trim assembly 10 is designed to provide a fully supported adjustable footrest assembly 16 that can carry force loads to the vehicle floorboard 62 including carrying such loads through standard carpet and insulation assemblies to the vehicle frame. As specifically shown in FIG. 4, a force load is indicated by arrow F in an angled and downward direction on the footrest assembly 16. Once the force F is realized on the footrest assembly 16 by a vehicle occupant's foot, a load path, indicated by arrow L, is adapted to carry the load from the footrest assembly 16 to the reinforcement members 20 to the vehicle floorboard 62. In this way, the cowl trim assembly 10 of the present invention provides for a one-piece fully integrated cowl trim assembly that provides adequate support for a modular adjustable footrest assembly 16 within a vehicle interior.

Generally, a footrest assembly must be supported by a structural feature operably coupled to a vehicle floorboard. As noted above, these structural supports are specifically configured and generally disposed underneath carpet and insulation features, such that if a footrest is desired within a vehicle interior, it must either be incorporated into the manufacturing process of the vehicle at the manufacturing plant, or be secured to the floorboard in an aftermarket procedure. The present invention allows for a footrest assembly to be installed in a vehicle without having to change the floorboard configuration, carpet and insulation or add structural reinforcement elements to the floorboards of the vehicle interior by providing a one-part solution which is adapted to receive and carry the load realized on the footrest through reinforcement members disposed under the footrest assembly on the cowl trim. As such, the cowl trim assembly 10 of the present invention allows for a footrest option to be added to a vehicle as an aftermarket option or during the manufacturing process. Adding structural elements to a floorboard of a vehicle interior and putting carpeting over such structural elements are specific manufacturing sequences that are generally carried out in the manufacturing process in a specific order. As such, adding a standalone footrest assembly requires manipulation of this precise sequence which generally translates to increased cost of manufacture. However, with the present invention, a desired footrest assembly can be installed within the vehicle interior without the need for floorboard reconfiguration, structural elements disposed on the floorboard, or separate carpet considerations, such as vinyl pads indicating the location of a footrest, such that the cowl trim and integrated footrest assembly of the present invention provides for a economic solution for a footrest option. The cowl trim assembly 10 of the present invention is adapted to be installed in a similar manner as a cowl trim assembly that does not include an adjustable footrest, such that manufacturing procedures that take place prior to a cowl trim installation do not need to be modified when installing the present invention.

Figure 5:
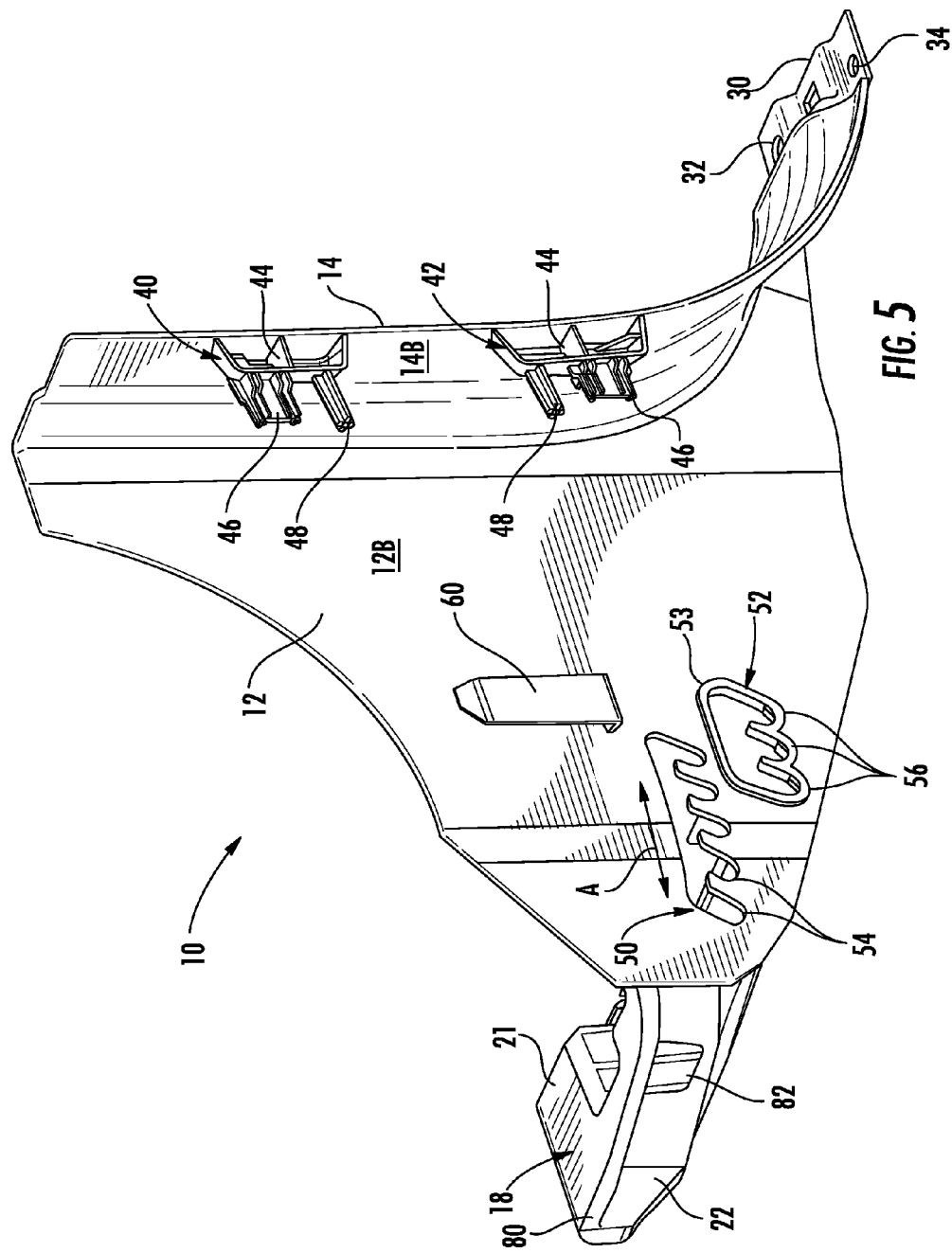
FIG. 5 is a rear perspective view of the cowl trim assembly of FIG. 4.

Referring now to FIG. 5, the anchor mechanisms 40, 42 include a base portion 44 having generally tapered side walls and a top wall which generally define the base portion 44. Internally, reinforcement members are disposed within the base portion 44 to rigidify the structure of the base portion 44 which, along with filleted edges disposed throughout the base portion 44, provides for a secure base for attaching the cowl trim piece 10 to a vehicle frame. The tapered sidewalls of the base portion 44 provide for a wedging engagement of the base portion 44 with the vehicle frame, such that better surface contact is made with the vehicle frame for facilitating the dispersion of forces from the cowl trim 10 to the vehicle frame. The clip member and guide member 46, 48 extend laterally from the top surface of the base portion 44 and are used to guide the anchor mechanisms 40, 42 to a secure engagement with the vehicle frame. As shown in FIG. 5, the guide members 48 are in the configuration of a cross-sectional peg member which is generally adapted to engage a guide aperture disposed on the vehicle frame. In this way, the guide members 48 insure that the clip members 46 will be guided to the proper locations for engagement with reciprocal clip members disposed on the vehicle frame. As noted above, the anchor mechanisms 40, 42 have reciprocal configurations, such that the guide members 48 and the clip members 46 are inversely disposed anchor mechanisms 40, 42. This inverse configuration provides for a more structurally sound engagement of the cowl trim assembly 10 with the vehicle frame.

As shown in FIG. 5, the side panel 12 further includes a first lateral slot 50 and a second lateral slot 52. As shown in FIG. 5, the lateral slots 50, 52 are disposed through the side panel 12, such that the lateral slots 50, 52 are accessible from both the exterior side 12A and interior side 12B of side panel 12, as further shown in FIG. 4. As shown in FIG. 5, the second lateral slot 52 is a bolstered lateral slot having a reinforcement rim portion 53 disposed about the perimeter thereof. As shown in FIGS. 4 and 5, the first lateral slot 50 is disposed above and in a car-forward position relative to the second lateral slot 52. Each of the lateral slots 50, 52 include receiving grooves 54, 56 respectively which are incrementally spaced along a length of the lateral slots 50, 52. The receiving grooves 54, 56 are angled receiving grooves which are generally positioned having a car-forward angle relative to the lateral slots 50, 52. The receiving grooves 54, 56 are adapted to receive connecting members disposed on the footrest assembly 16 as further described below. As specifically shown in FIG. 4, the lateral slots 50, 52 are disposed adjacent to the integrated support base 18 on the side panel 12 of the cowl trim assembly 10. In this way, the footrest assembly 16 can be supported on the integrated support base 18 and be operably coupled to the cowl trim assembly 10 in an adjustable manner via lateral slots 50, 52. Thus, the footrest assembly 16, as shown in FIG. 1, utilizes a shift and lock pattern which is integrated into the side panel 12 of the cowl trim assembly 10 via laterally extending slots 50, 52. In a manufacturing setting, the footrest assembly 16 will be preassembled on the cowl trim assembly 10 prior to vehicle assembly. Once the cowl trim assembly 10 is installed in a vehicle, a driver will pull the adjustable footrest assembly 16 upward in a path as indicated by arrow B in FIG. 1 and then slide the footrest assembly 16 laterally between fore and aft positions within the lateral slots 50, 52 until the footrest assembly 16 is disposed in an incremental position desired by the vehicle user. After being moved laterally to a desired position, the footrest assembly 16 will be positioned into the angled receiving grooves 54, 56 of the lateral slots 50, 52. Upon lowering the adjustable footrest assembly 16, the footrest assembly 16 will lock into a preset position determined by the position of the angled receiving grooves 54, 56 of the lateral slots 50, 52. Thus, the adjustable footrest assembly 16, as shown in the embodiment of FIG. 1, demonstrates a lateral travel distance of approximately 35 mm with incremental positions of 17.5 mm, however, it is contemplated that this distance of travel and incremental settings can be designed and modified to fit into a particular vehicle's architectural constraints. As noted above, the adjustable footrest assembly 16 comprises connecting members which are used to connect the adjustable footrest assembly 16 to the side panel 12 of the cowl trim assembly 10 at lateral slots 50, 52. The configuration of the connecting members of the footrest assembly 16 will now be described.

Figure 7:
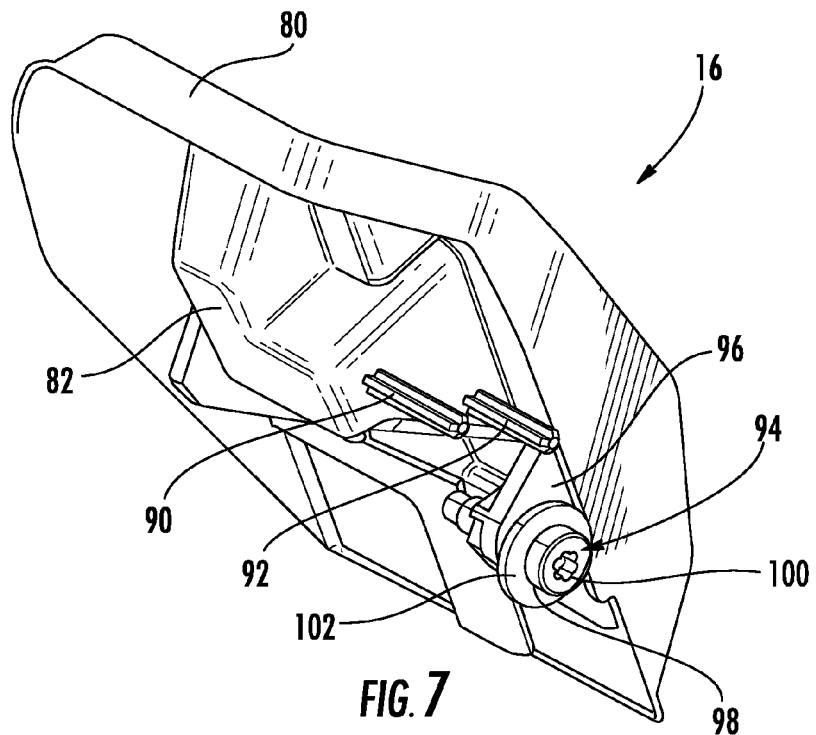
FIG. 7 is a bottom perspective view of a footrest assembly according to one embodiment of the present invention.
Figure 7A:
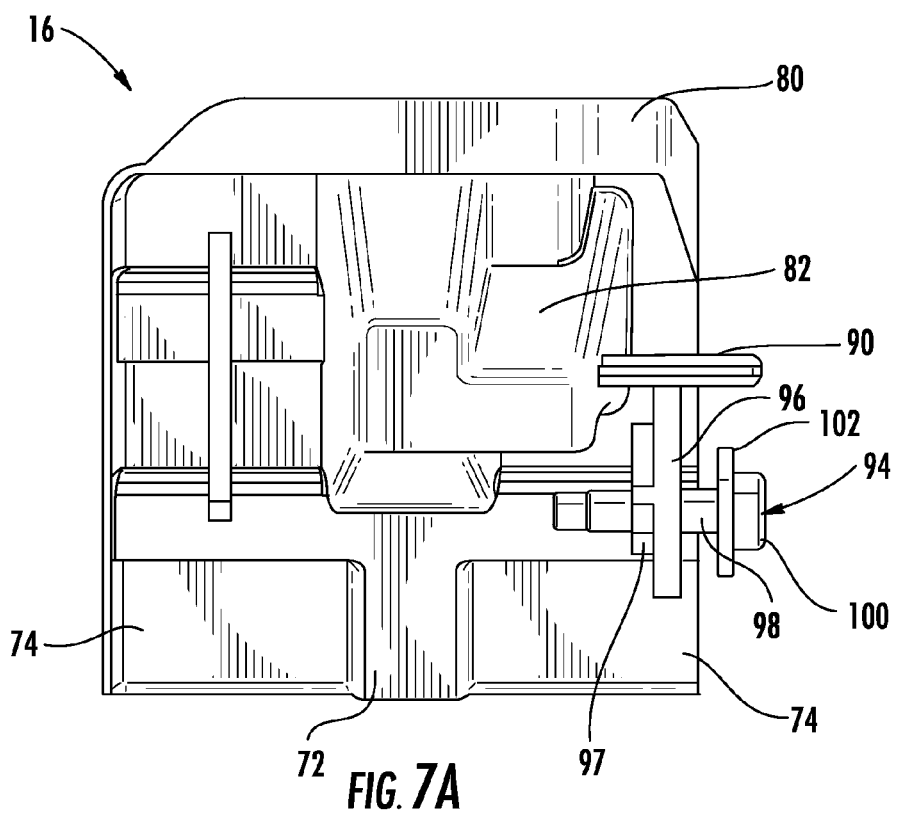
FIG. 7A is a rear elevational view of the footrest assembly of FIG. 7.
Figure 7B:
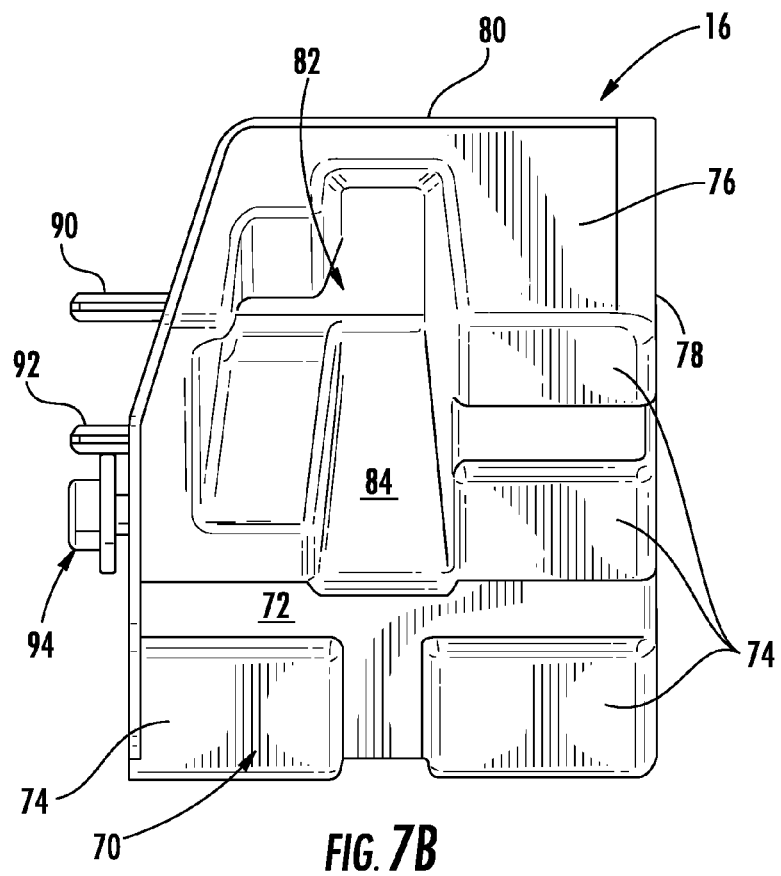
FIG. 7B is a top plan view of the footrest assembly of FIG. 7.
Figure 7C:
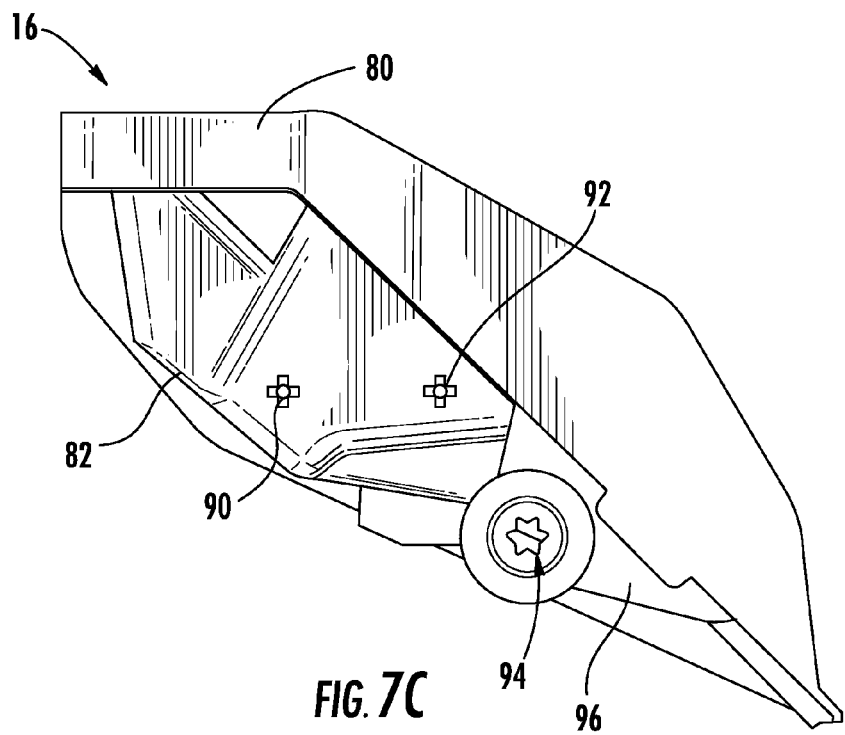
FIG. 7C is a side elevational view of the footrest assembly of FIG. 7.

Referring now to FIGS. 1 and 7-7C, the footrest assembly 16 includes an upper contact surface 70 which is a generally planar contact surface disposed at a predetermined angle relative to the vehicle floor. The upper contact surface includes a generally planar portion 72 having a plurality of raised contact pads 74. The raised contact pads 74 provide a contoured or tractioned surface for the contact surface 70 to better engage the shoe of a vehicle occupant in a slip-resistant manner. The footrest assembly 16 further includes a top wall 76 and a side wall 78 which are generally disposed in a perpendicular relationship to one another. The top wall 76 and side wall 78 generally follow the contours of the top wall 21 and side wall 22 of the integrated support base 18 as shown in FIG. 4. The adjustable footrest assembly 16 further includes an upper rim portion 80 which extends along the top wall 76 at a distal most end and wraps around to provide a rim portion for the angled contact surface 70 which, in assembly, is disposed adjacent to the exterior side 12A of side panel 12 of the cowl trim assembly 10. As best shown in FIGS. 1 and 7B, the footrest assembly 16 further includes a contoured depression 82 which, in assembly, is adapted to receive and engage a parking brake pedal structure 122, as further shown in FIG. 8. The contoured depression 82 includes an angled surface 84 which, in assembly, allows for water, snow, ice and other debris to gravitationally exit the contoured depression 82, such that this debris is directed down the angled portion 84 of the depression or divot 82 and down the angled contact surface 70, such that the footrest assembly 16 provides for a self-draining design. Further, the depression 82 is surrounded by geometric detail, such as the raised contact pads 74, which are designed to camouflage the contrast of the park brake nest or depression 82 which is surrounded by the planar portion 72 of a footrest assembly 16. Having the park brake depression 82, the footrest assembly 16 can accommodate a park brake pedal geometry and actuation constraints as further described below with reference to FIG. 8.

Having the depression 82 disposed on the footrest assembly 16, a unique contoured configuration is provided on the underside of the footrest assembly 16 as shown in FIG. 7. The reinforcement members, as shown in FIG. 4, are specifically designed to support the contoured underside of the footrest assembly 16 even as the footrest assembly 16 is moved between fore and aft positions. With specific reference to FIGS. 2 and 7-7C, the footrest assembly 16 includes first and second connecting members 90, 92 which are disposed on the underside of the park pedal depression 82 and which extend laterally from the depression 82 towards the cowl trim assembly 10. The connecting members 90, 92 are shown in the embodiments of FIGS. 7-7C as cross-shaped peg members which are adapted to be received in the receiving grooves 54 of lateral slot 50, as shown in FIG. 2. As further shown in FIG. 2, the connecting members 90, 92 are received in receiving grooves 54 in such a manner that the footrest assembly 16 is adjustable, in this embodiment, between three incremental positions in a linear direction as indicated by arrow A. Further, an additional connecting member 94 is coupled to a connecting bracket 96 which is disposed on the underside of the footrest assembly 16. The connecting member 94, as best shown in FIG. 7, includes a fastener member 98 having a head portion 100 disposed adjacent to a washer-type assembly 102. In assembly, as best shown in FIG. 7A, the connecting member 94 includes a spacing between the washer member 102 and the connecting bracket 96, such that an elongate body portion of the fastener 98 can be received in the receiving grooves 56 disposed on lateral slot 52 of the side panel 12. As shown in FIG. 5, the lateral slot 52 includes three receiving grooves 56, such that the connecting member 94 can move laterally in a direction as indicated by arrow A between the incremental positions of lateral movement incorporated into the design of the adjustable footrest assembly 16. The connecting member 94 can be threaded into a plate 97 disposed on the connecting bracket 96 as shown in FIG. 7A. Other means for coupling the connecting member 94 to the connecting bracket 96 are also contemplated. As shown in FIG. 2, the connecting member 94 is disposed within a receiving groove 56 of lateral slot 52 such that the adjustable footrest assembly 16, as shown in FIG. 2, is disposed in a car-rearward direction, such that the footrest assembly 16 is disposed in the incremental position that is nearest the vehicle occupant. In assembly, the head 100 and washer member 102 serve to positively engage the modular footrest assembly 16 with the cowl trim assembly 10. Thus, the connecting member is retained in slot 52 by the washer head 100 and washer 102 configuration. In this way, the footrest assembly 16 remains engaged with and coupled to the cowl trim assembly 10 at all times, even during footrest adjustment. Further, connecting members 90, 92 are of a sufficient length that they remain engaged with slot 50 at all times, even as the footrest assembly 16 can have some play in its connection with the panel body based on the spacing of the body portion of fastener 98 of connecting member 94.

Referring now to FIG. 8, the cowl trim assembly 10 is shown in an environmental view within a vehicle interior. The cowl trim assembly 10 is disposed on the vehicle frame 110 which is generally comprised of a sheet metal part which provides for a structurally sound and rigid part of the vehicle frame 110 for the cowl trim assembly 10 to couple thereto. The front panel 14 of the cowl trim assembly 10 is shown coupled to an upright portion 112 of a door sill frame at an upper end, such that in this configuration, the anchor mechanisms 40, 42 are disposed in and coupled to engagement features disposed on the upright 112. Further, the tab portion 30 disposed at a lower end of the front wall 14 has attachment apertures 32, 34 which are configured in a stepped pattern to match the vehicle frame portion 114 which is generally considered a rocker plate frame component. As noted above, the rocker plate 114 will further be covered by a scuff plate trim member which is adapted to cover the underlay tab portion 30 of the cowl trim assembly 10. In this way, the tab portion 30 provides another attachment location for the cowl trim assembly 10 to ensure secure engagement of the cowl trim assembly 10 to the vehicle frame 110.

As further shown in FIG. 8, a brake pedal 120, such as an emergency brake pedal, is shown having a pedal portion 122 coupled to a brake arm 124. The brake pedal 120 is operable between an at-rest position D and an actuated position E. As shown in FIG. 8, the brake pedal 120 moves between the at-rest position D and the actuated position E along an actuation path C. Once in the actuated position E, the pedal portion 122 of the brake pedal 120 is disposed or nested within the depression or divot 82 as found on the upper contact surface 70 of the adjustable footrest assembly 16. Thus, the adjustable footrest assembly 16 and cowl trim assembly 10 can be installed in a vehicle where a footrest assembly would generally interfere with the actuation path of a brake pedal, however, with the nesting feature incorporated into the adjustable footrest assembly 16 of the present invention, a brake pedal, such as brake pedal 120 shown in FIG. 8, can travel without constraint along the actuation path C to an actuated position E, wherein the pedal portion 122 is nested within the adjustable footrest assembly 16.

Thus, the present invention comprises a cowl trim assembly 10 which provides an adjustable footrest assembly 16 which is adjustable between fore and aft positions in a linear fashion relative to a vehicle occupant. The present invention provides for simplicity in execution as the cowl trim assembly 10 can use existing attachment locations on a vehicle frame to thereby provide a low cost adjustable footrest assembly in a vehicle interior.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A cowl trim assembly, comprising:
   a panel body including one or more lateral slots having a plurality of receiving grooves spaced along a length thereof;
   a support base extending outwardly from the panel body; and
   an adjustable footrest assembly supported on the support base between fore and aft positions, the footrest assembly including one or more connecting members adapted to be received in the receiving grooves to couple the footrest assembly to the panel body.

2. The cowl trim assembly of claim 1, wherein:
   the panel body includes first and second lateral slots, and further wherein the first and second lateral slots are vertically spaced apart.

3. The cowl trim assembly of claim 2, wherein:
   the adjustable footrest assembly includes first and second connecting members adapted to couple to the receiving grooves of the first lateral slot and a third connecting member adapted to couple to the receiving grooves of the second lateral slot.

4. The cowl trim assembly of claim 3, wherein:
   the adjustable footrest assembly is adapted to be adjusted laterally along the length of the first and second lateral slots in an incremental manner as defined by the receiving grooves of the first and second lateral slots.

5. The cowl trim assembly of claim 1, including:
   a contact surface disposed on an upper side of the adjustable footrest assembly, the contact surface adapted to receive a force load as applied by a vehicle occupant.

6. The cowl trim assembly of claim 5, including:
one or more reinforcement members disposed on the support base, each reinforcement member having a top surface and a bottom surface, the top surface adapted to abut and support the adjustable footrest assembly and the bottom surface adapted to abut a vehicle floorboard in assembly.

7. The cowl trim assembly of claim 6, wherein:
the one or more reinforcement members are disposed in a generally parallel spaced apart relationship and further wherein the one or more reinforcement members are adapted to carry the force load from the contact surface of the adjustable footrest assembly to the vehicle floorboard as applied by the vehicle occupant.

8. The cowl trim assembly of claim 1, including:
a plurality of anchor mechanisms disposed on the panel body, the anchor mechanisms adapted to couple the cowl trim assembly to a vehicle frame.

9. The cowl trim assembly of claim 5, including:
a depression disposed on the contact surface of the adjustable footrest assembly, the depression adapted to receive a brake pedal when the brake pedal is in an actuated position along an actuation path.

10. A cowl trim assembly, comprising:
a panel body including an outwardly extending support base;
a modular footrest assembly supported on the support base, the footrest assembly including one or more connecting members;
one or more slots disposed on the panel body having a plurality of receiving grooves adapted to receive the connecting members of the footrest assembly; and
wherein the footrest assembly is laterally adjustable relative to the panel body along the slots.

11. The cowl trim assembly of claim 10, wherein:
the one or more slots includes first and second laterally extending slots, and further wherein the first and second laterally extending slots are vertically spaced apart from one another.

12. The cowl trim assembly of claim 11, wherein:
the one or more connecting members includes first and second connecting members adapted to couple to the receiving grooves of the first laterally extending slot and a third connecting member adapted to couple to the receiving grooves of the second laterally extending slot.

13. The cowl trim assembly of claim 12, wherein:
the modular footrest assembly is adapted to be adjusted laterally along a length of the first and second laterally extending slots in incremental positions as defined by the receiving grooves of the first and second laterally extending slots.

14. The cowl trim assembly of claim 10, wherein:
the panel body and the support base are integrated components of the cowl trim assembly.

15. The cowl trim assembly of claim 14, wherein:
the panel body includes a side panel portion and a front panel portion.

16. The cowl trim assembly of claim 15, including:
a plurality of anchor mechanisms disposed on the front panel portion, the anchor mechanisms adapted to couple the cowl trim assembly to a vehicle frame.

17. A cowl trim assembly, comprising:
a panel body including a support base;
first and second laterally extending slots disposed on the panel body;
an adjustable footrest assembly slidably supported on the support base, the footrest assembly having connecting members adapted to couple with the first and second laterally extending slots;
incremental receiving grooves disposed on the first and second laterally extending slots, the incremental receiving grooves adapted to receive the connecting members of the adjustable footrest assembly to couple the footrest assembly to the panel body at predetermined locations; and
wherein the adjustable footrest assembly is laterally adjustable relative to the panel body.

18. The cowl trim assembly of claim 17, including:
a depression disposed on a contact surface of the adjustable footrest assembly, the depression adapted to receive a brake pedal when the brake pedal is in an actuated position along a brake pedal actuation path.

19. The cowl trim assembly of claim 18, including:
one or more reinforcement members disposed on the support base, each reinforcement member having a top surface and a bottom surface, the top surface adapted to abut and support the adjustable footrest assembly and the bottom surface adapted to abut a vehicle floorboard in assembly.

* * * * *